April 30, 1929.  L. F. VEREECKEN  1,710,908
FISH LURE
Filed June 13, 1927
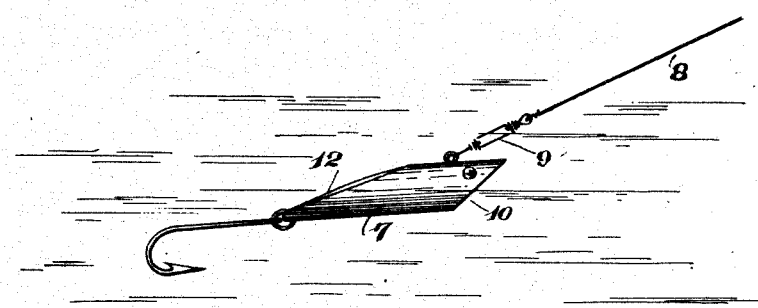
Fig. 1
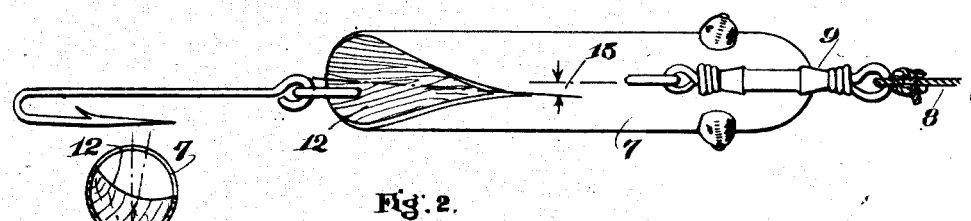
Fig. 2
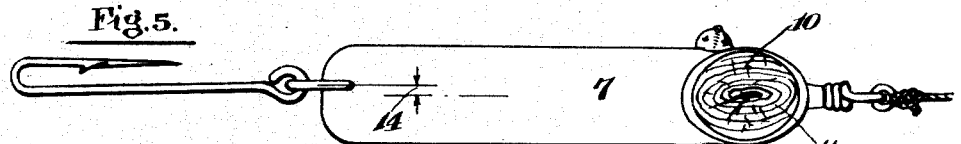
Fig. 3
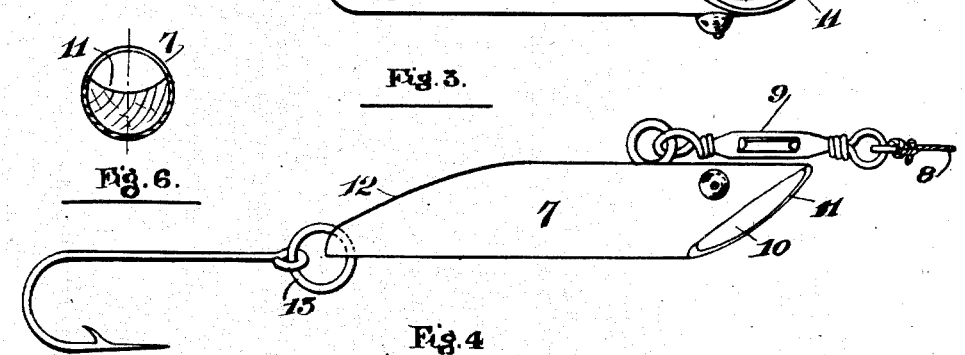
Fig. 4
Fig. 5.
Fig. 6.
Laurent F. Vereecken
Inventor.
Attorney.

Patented Apr. 30, 1929.

1,710,908

UNITED STATES PATENT OFFICE.

LAURENT F. VEREECKEN, OF VANCOUVER, BRITISH COLUMBIA, CANADA.

FISH LURE.

Application filed June 13, 1927. Serial No. 198,435.

This invention relates to fish-lures, its object being to provide a fishing bait for use in trolling which operates differently from the ordinary spoon bait inasmuch as with the latter class of lure, the motion or apparent motion is invariably of a more or less regular character, whereas the seat of the present invention resides in the fact that the motions of the lure are irregular and erratic, being adapted to create the impression that the bait is attempting to escape pursuit by a sudden spring upwards or sidewards but with no marked regularity of interval or direction in its movements.

In this lure the spoon-shape is abandoned entirely in favour of a tubular body of bright metal and for this purpose I prefer Muntz metal as this retains its reflecting surface to very good advantage being almost unaffected by the salt water which tends to tarnish, if not corrode, certain brass alloys.

The tubular body before named is cut at each extremity to form an angular facet, the inside of the tube being plugged preferably with teakwood, the outer surfaces of which are suitably painted, say red at the head end and silver at the tail. These angular facets are cut to different angles and in different planes which have an angular relation to each other.

By this device the lure when under the strain of the line acquires a directional resistance which becomes cumulative, resulting in a sudden alteration of its course in the water and producing thereby the desired effect.

The head end of the lure is embellished with opalescent and protruding beads to simulate eyes and the line is secured to a swivel on the back, the hook being attached to a ring at the tail end, the connection of the latter being also non-central, thus giving another bias to the hook strain.

The invention is clearly shown in the drawings herewith forming part of this application in which:

Fig. 1 is a general view showing the lure in its operative position in the water.

Fig. 2 is a plan of the top side showing the rear facet out of alignment.

Fig. 3 is an inverted plan.

Fig. 4 is a side view.

Fig. 5 is a cross section through the rear facet.

Fig. 6 is a cross section through the front facet.

Taking the drawings in detail and noting that similar numerals in the different views indicate identical parts, the tubular body is indicated by 7 to which the line 8 is attached by the swivel 9 at the fore part of the back.

The angular facet or cutwater is shown at 10, the interior wood filling 11 being colored red.

It will be observed that the front facet 10 is symmetrical and on the centre line of the tube, but that the rear facet 12 is longer and merges into a curved form, also that it is not symmetrical nor on the centre line of the tube as indicated at 15.

The hook ring 13 is secured to the rear extremity of the facet at a point which is offset as indicated at 14.

Having now fully described my invention, what I claim and desire to be protected in by Letters Patent, is:—

1. A fish-lure comprising a short tubular member, said tubular member being plugged and having at its extremities substantially angular facets above and below its axis respectively, a swivel pivotally secured to the upper fore part of said tubular member, a hook pivotally secured to the rear edge of said member.

2. A fish-lure comprising a short tubular member, said tubular member being plugged and having at its extremities substantially angular facets above and below its axis respectively, the surface of one of said facets being in a plane which angularly intercepts the plane of the said opposite facet, a swivel pivotally secured to the upper fore part of said tubular member, hook pivotally secured to the rear edge of said member.

3. A fish-lure comprising a short tubular member, said tubular member being plugged and having at its extremities substantially angular facets above and below its axis respectively, the surface of one of said facets being in a plane which angularly intercepts the plane of the said opposite facet, a swivel pivotally secured to the upper fore part of said tubular member, a hook pivotally secured to the rear edge of said member, a projecting bead on each side of the fore part of said member adapted to resemble a conspicuous eye.

4. A fish-lure comprising a short tubular member, said tubular member being plugged and having at its extremities substantially angular facets above and below its axis respectively, the surface of one of said facets being in a plane which angularly intercepts the plane of the said opposite facet, the said planes being so related that perpendiculars from them would not line in parallel planes, a swivel pivotally secured to the upper fore part of said tubular member, a hook pivotally secured to the rear edge of said member.

In testimony whereof I affix my signature.

LAURENT F. VEREECKEN.